(12) United States Patent
Balaj

(10) Patent No.: US 12,479,605 B2
(45) Date of Patent: Nov. 25, 2025

(54) PROPULSIVE LANDING ROCKET LANDING LEG SYSTEM, AND METHODS OF MAKING AND USING THE SAME

(71) Applicant: Arist Balaj, Danbury, CT (US)

(72) Inventor: Arist Balaj, Danbury, CT (US)

( * ) Notice: Subject to any disclaimer, the term of this patent is extended or adjusted under 35 U.S.C. 154(b) by 113 days.

(21) Appl. No.: 18/242,972

(22) Filed: Sep. 6, 2023

(65) Prior Publication Data

US 2024/0228068 A1 Jul. 11, 2024

Related U.S. Application Data

(60) Provisional application No. 63/404,160, filed on Sep. 6, 2022.

(51) Int. Cl.
*B64G 1/62* (2006.01)

(52) U.S. Cl.
CPC ................... *B64G 1/625* (2023.08)

(58) Field of Classification Search
CPC ................... B64G 1/625; B64G 1/62
See application file for complete search history.

(56) References Cited

U.S. PATENT DOCUMENTS

| | | |
|---|---|---|
| 3,015,274 A | 1/1962 | Papesh |
| 3,716,208 A | 2/1973 | Fagan et al. |
| 3,903,801 A | 9/1975 | Senoski |

(Continued)

FOREIGN PATENT DOCUMENTS

| | | | | |
|---|---|---|---|---|
| CN | 105892558 A | * | 8/2016 | |
| CN | 109264032 A | * | 1/2019 | ............... B64G 1/62 |

(Continued)

OTHER PUBLICATIONS

Blackmore, Lars, "Autonomous Precision Landing of Space Rockets," Frontiers of Engineering: Reports on Leading-Edge Engineering from the 2016 Symposium, 2016; 13 pages.

(Continued)

*Primary Examiner* — Justin M Benedik
(74) *Attorney, Agent, or Firm* — UConn IP Law Clinic; Henry Zinn; Torsten Voigt

(57) ABSTRACT

The embodiments described herein provide a propulsive landing rocket landing leg system that provides for a high probability of a successful landing across wide stress and flow regimes due to the mechanism's ability to be implemented across a variety of compact and aerodynamic landing leg geometries. It provides for the ability to control unfolding speed for increased stabilization and removes unfolding dependence on the assistance of the gravitational force or separate "forced" actuating deployment sub-systems. The utilization of both rotational and linear damping units provides higher flexibility in the sourcing of lower cost components promoting higher cost-efficient construction and ease of parameter adaptation for the respective dynamics of the mechanism. The structural arrangement of the components allows for favorable distribution of stress, and in turn high stress tolerance due to the collaborative efforts of the parallel linear rod shafts and the landing leg structure, thus effective management of bending and other stress modes. Corresponding landing legs and methods are disclosed.

11 Claims, 19 Drawing Sheets

(56) References Cited

U.S. PATENT DOCUMENTS

| | | |
|---|---|---|
| 7,395,890 B2 | 7/2008 | Visscher |
| 8,006,936 B1 | 8/2011 | Farr, III |
| 8,678,321 B2 | 3/2014 | Bezos et al. |
| 9,073,604 B2 | 7/2015 | Mallette et al. |
| 9,457,918 B2 | 10/2016 | Hand |
| 9,487,308 B2 | 11/2016 | Featherstone et al. |
| 10,093,433 B2 | 10/2018 | Knudsen et al. |
| 10,703,494 B2 | 7/2020 | Sweeny et al. |
| 2007/0012820 A1 | 1/2007 | Buehler |
| 2010/0320329 A1 | 12/2010 | Boelitz et al. |
| 2011/0163201 A1 | 7/2011 | Buchwald et al. |

FOREIGN PATENT DOCUMENTS

| | | | | |
|---|---|---|---|---|
| CN | 111038743 A | * | 4/2020 | |
| CN | 111891410 A | * | 11/2020 | ............... B64G 1/62 |
| KR | 1807424 B1 | * | 12/2017 | ............... B64G 1/62 |
| KR | 20230029274 A | * | 3/2023 | |

OTHER PUBLICATIONS

Thies, Christoph, "Drop Test Description and Evaluation of a Landing Leg for a Reusable Future Launch Vehicle", 2nd Int'l Conf. on Flight Vehicles, Jun. 19-23, 2022, 9 pages.

Space Launch Report: SpaceX Falcon 9 v1.2 Data Sheet, Feb. 22, 2018, 9 pages.

Wang, Chen et al., "Parameterized Design and Dynamic Analysis of a Reusable Launch Vehicle Landing System with Semi-Active Control," Symmetry 2020, 12, 1572 (2020); 21 pages.

* cited by examiner

Fig. 9A
Fig. 9B
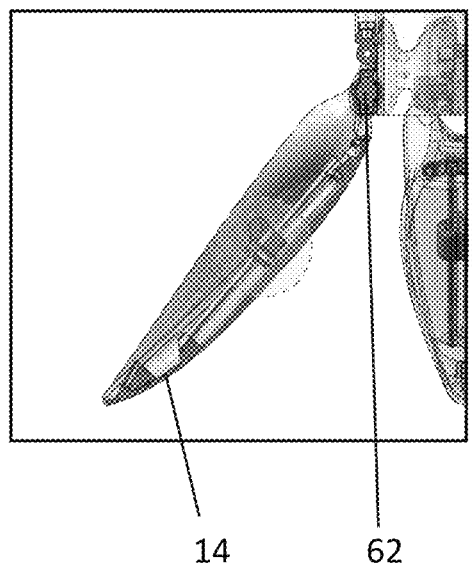
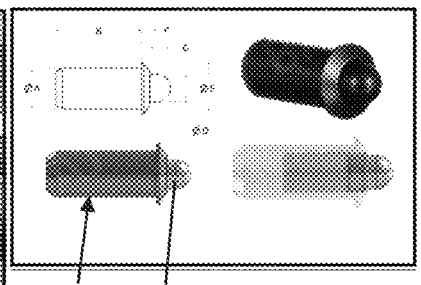
14  62
64  66
Fig. 10
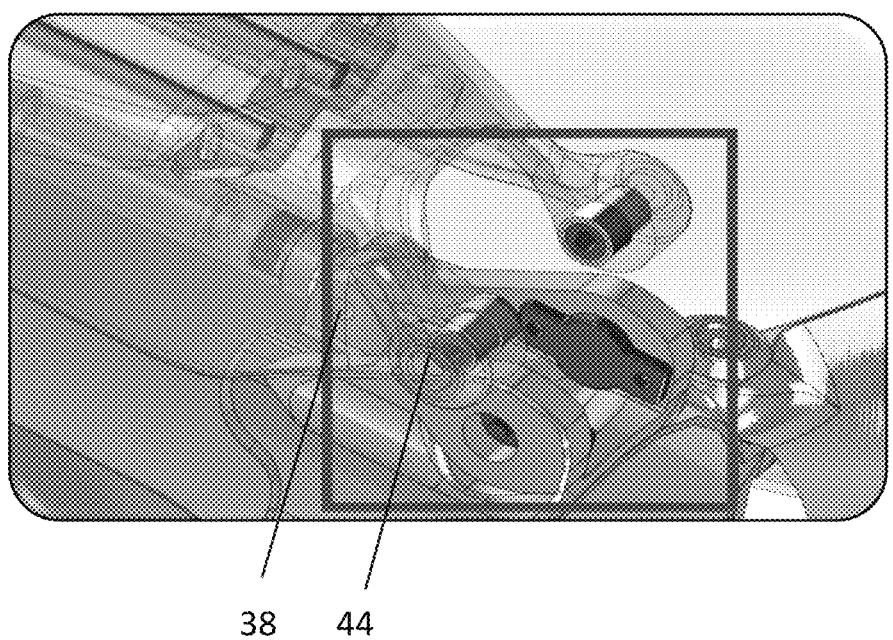
38  44

14

40

74

52

76

78

80

82

84

289  264

294

PROPULSIVE LANDING ROCKET LANDING LEG SYSTEM, AND METHODS OF MAKING AND USING THE SAME

CROSS-REFERENCE TO RELATED APPLICATIONS

This application claims the benefit of, and priority to, U.S. Provisional Patent Application No. 63/404,160 filed Sep. 6, 2022, the contents of which are incorporated by reference herein in their entirety.

BACKGROUND

This disclosure relates generally to rocketry, and more particularly to propulsive landing systems.

Telescoping and parallel linkage rocket landing systems are generally known. For example, SpaceX uses a telescoping rocket landing system on their booster rockets, and Blue Origin utilizes a parallel linkage system to deploy damping units in position on the New Shepard rocket. It is useful to develop alternative and improved types of rocket landing systems that can control unfolding speed, easily allow for the adaptability and replacement of mechanical components, and that allow the ability to withstand high structural stress during flight and contact with the launching pad.

SUMMARY

One embodiment described herein is a rocket landing leg, comprising a body having a first end portion configured to contact a surface upon landing, a central portion, and a second end portion configured to be pivotally connected to a rocket, a first revolute joint configured to connect the body to the rocket and to control pivotal rotation of the body relative to the rocket, a first rod shaft connected to opposite first and second ends of the central portion of the body, and a first bias component associated with the first rod shaft, the first bias component and first rod shaft being configured to enable rotation of the landing leg from a folded storage position to an unfolded operating position. The landing leg also includes a shock absorber connected to the central portion and configured to be directly or indirectly connected to the rocket, the shock absorber including a central shaft associated with a shock absorbing spring configured to allow for limited pivotal movement of the landing leg relative to the rocket before the landing leg initially contacts the landing surface, and a damping unit configured to cushion the landing of the rocket upon contact with the landing surface, a second revolute joint configured to pivotally connect the second end of the shock absorber to the rocket, a linear bearing module configured to allow the body to pivot from the folded storage position to the unfolded operating position, the linear bearing module including a connection point for the second end portion of the body, and the second end portion of the shock absorber, a locking mechanism configured to lock the landing leg in the storage position or the operating position, and a power source configured to permit and/or power rotation of the landing leg between the storage position and the operating position.

Another embodiment described herein is a system which comprises a plurality of landing legs, and a rocket body module configured to connect the landing legs to a rocket.

Yet another embodiment is a system comprising a plurality of landing legs, a rocket, and a rocket body module connecting the landing legs to the rocket.

Yet another embodiment is a landing leg arrangement with aerodynamic and stress management geometry, including a plurality of landing legs connected to the rocket body at a primary axis, with two points of connection at which rotational damping, and a single degree of freedom is permitted at such an axis.

Yet another embodiment is a shock absorber fixed into a location for the landing sequence of the spacecraft is achieved via a linear bearing module.

Yet another embodiment is an unfolding mechanism for the landing leg arrangement comprising of a linearly shifting assembly, whose displacement is to be achieved by one of the following power sources: a solenoid, linear servo motor, rack and pinion via servo motor.

BRIEF DESCRIPTION OF THE DRAWINGS

FIGS. 9A and 9B show details of the spring plunger used in the first, second, and third embodiments.

FIG. 10 shows details of the revolute joints used in various embodiments.

DETAILED DESCRIPTION

The embodiments described herein provide for a propulsive landing rocket landing leg system that provides for a high probability of a successful landing across wide stress and flow regimes due to the mechanism's ability to be implemented across a variety of both compact and aerodynamic landing leg geometries. It offers the tremendously important ability to control unfolding speed for increased stabilization placing less strain on Guidance, Navigation and Control measures via the Propulsive Unit and other Aerostructures in the flight stage of landing pad contact, and removes unfolding dependence on the assistance of the gravitational force or separate "forced" actuating deployment sub-systems. The utilization of both rotational and linear damping units provides higher flexibility in the sourcing of lower cost components promoting higher cost-efficient construction and ease of parameter adaptation for the respective dynamics of the mechanism. The structural arrangement of the components allows for better distribution of stress, and in turn higher stress tolerance due to the collaborative efforts of the parallel linear rod shafts and the landing leg structure, thus effective management of bending and other applicable modes of stress. The ability to add spring plunger units to meet larger load demands during landings, is vital for scaling the unit for larger rocket systems. Such benefits are vital for implementation into future space systems that will serve planetary exploration missions in the realms of logistics, transportation, etc.

Figure 11A:
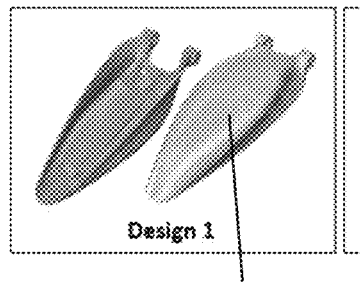
FIGS. 11A-11I show component parts of the landing system that can be made by additive manufacturing in accordance with certain embodiments.
Figure 11B:
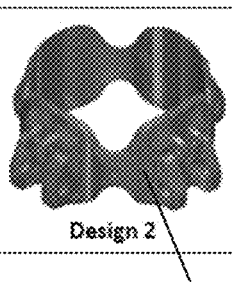

As used herein a "rocket body multi-purpose module" or "rocket body module" includes a component, a non-limiting example of which is shown in FIG. 11B, that acts as connection point for the shock absorber and landing legs to the rocket body. In some cases, it is incorporated as part of the rocket body.

As used herein, the term "linear bearing multi-purpose module" or "linear bearing module" (see, for example, one possible configuration in FIG. 11D) includes a component that houses the linear bearings for the translational degree of freedom for the landing leg. It also includes a point of connection for the shock absorber and it houses the locking mechanism, i.e. spring plungers, for the landing legs.

As used herein, the term "solenoid unfolding module" (FIG. 11—the conglomeration of 11C, 11F, 11G, and 11H) houses the power source for the landing leg unfolding mechanism, and contains alignment features for the extension arms connected to the landing legs.

Figure 1:
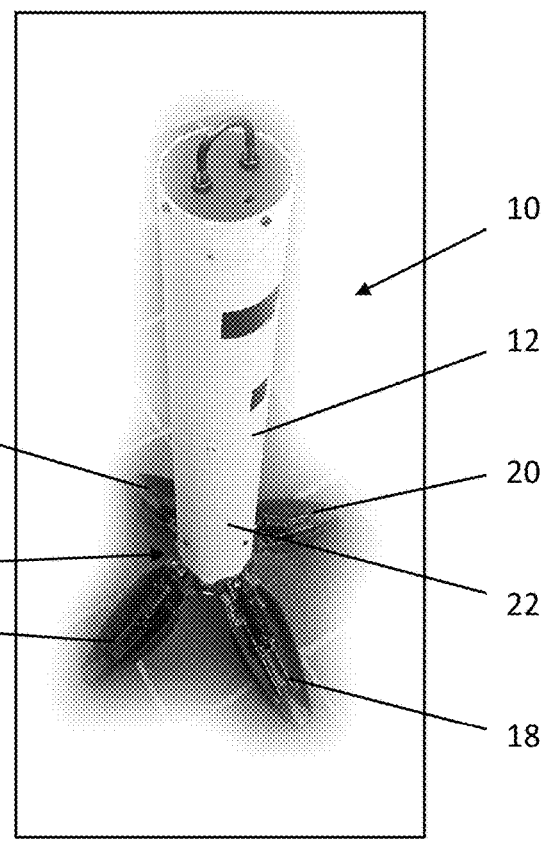
FIG. 1 shows the first embodiment of a propulsive landing suspension system described herein when a plurality of landing legs are attached to a rocket body that is positioned on a landing surface.

Referring now to the drawings, FIGS. 1-5 shows a first embodiment of a rocket with the landing suspension system described herein after the rocket has landed on a landing surface. In FIG. 1, a rocket assembly, generally designated as 10, includes a rocket or tubular portion 12 and a landing system 11 including a plurality of landing legs. A first landing leg 14, a second landing leg 16, a third landing leg 18 and a fourth landing leg 20 are pivotally connected to a lower end portion 22 of the tubular portion 12. In other embodiments, the rocket may include 2, 3, 5 or more landing legs. As shown in FIGS. 1-4, the landing leg 14 includes a landing leg body 13 with a concave inner surface 15 and a convex outer surface 17, a first end portion 19 configured to contact a surface upon landing, an opposite second end portion 21 configured to be pivotally connected to a tubular portion 12 of the rocket assembly 10, and a central portion 23 therebetween. In embodiments, each of the landing legs 14, 16, 18 and 20 has the same configuration.

Figure 2:
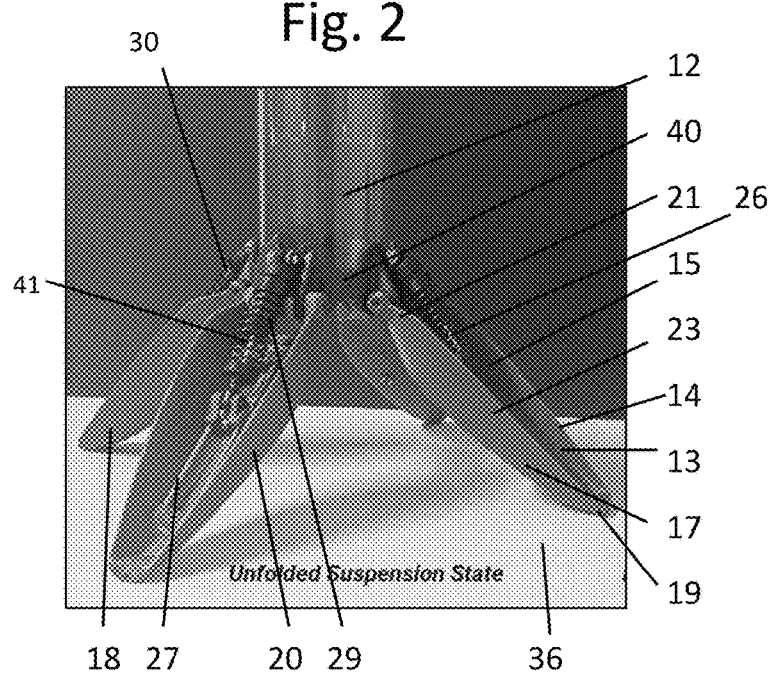
FIG. 2 shows the details of the first embodiment in an unfolded configuration.

FIG. 2 shows the first embodiment of the rocket assembly 10 with the legs 14, 16, 18 and 20 unfolded as they would be just before landing. The timing for the pivotal unfolding of the legs will depend on various factors, as the unfolded configuration provides greater air resistance than the folded arrangement. Each landing leg includes a shock absorber that possesses two primary purposes, firstly to control vibration, via energy dissipation through a damping methodology, and secondly, a spring action referring to the purpose of energy storage and energy deployment (the combination of these two characteristics may function via a variety of means, among which may include viscous damping shock absorber, pneumatic (air, or another gas deemed suitable under operating conditions) shock absorber, external reservoir shock absorber, hydraulic shock absorber, and including but not limited to magnetic based shock absorbers. The first landing leg 14 has a first shock absorber 26, the second landing leg 16 has a second shock absorber (not shown), the third landing leg 18 has a third shock absorber 30 and the fourth landing leg 20 has a fourth shock absorber 32.

Figure 3:
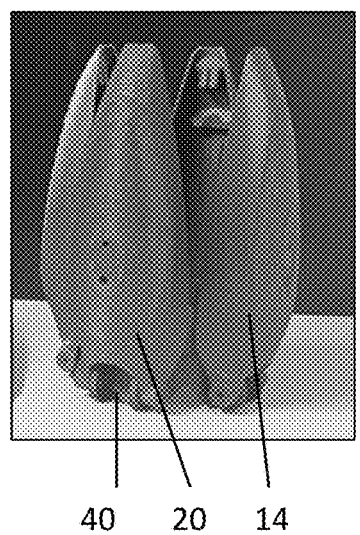
FIG. 3 shows the details of the first embodiment in a folded configuration.

FIG. 3 shows the landing legs 14, 16, 18, 20 in a folded configuration. The landing legs 14, 16, 18, 20 are designed with aerodynamics taken into account with both their folded configuration and their unfolded configuration, by firstly the possession of appropriate symmetrical geometry that serves to minimize sources of turbulence initiation relative to an incoming free stream that would otherwise lead to flow mixing, and secondly the minimization of skin friction via a low roughness surface profile of the curved structure when in contact with the flow. A controlled descent via the rocket's propulsion unit and aero-structures is performed, prior to contact with the landing pad surface. When the landing legs 14, 16, 18 and 20 make contact with the landing pad 36, The shock absorbers 26, 30, 32 (second shock absorber not shown) undergo compression related with the input load due to the reactionary force of the ground due to the rocket's mass colliding with the landing pad. The shock absorber 26 is connected to the central portion 23 and is configured to be directly or indirectly connected to the tubular portion 12 of the rocket assembly 10. As shown in FIG. 1-5, shock absorber 26 includes a central shaft 41 associated with a shock absorbing spring 29 configured to allow for limited pivotal movement of the landing leg 14 relative to the tubular portion 12 before the landing leg 14 initially contacts the landing surface, such as a landing pad 36, and a damping unit 61 (such as a rotary damper) configured to both cushion the unfolding process of the leg from folded to unfolded state, as well as serving additional simultaneous damping method during the landing of the rocket assembly 10 upon contact with the landing surface.

Figure 4:
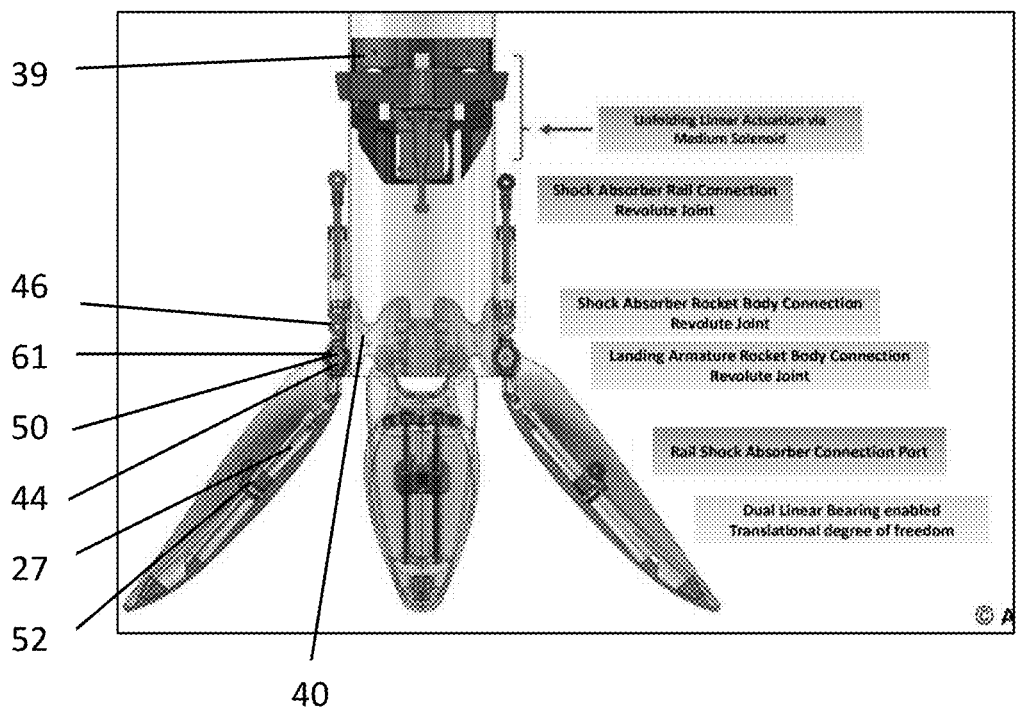
FIG. 4 shows the details, various components, and connection points that make up the first embodiment in an unfolded configuration.
Figure 5:
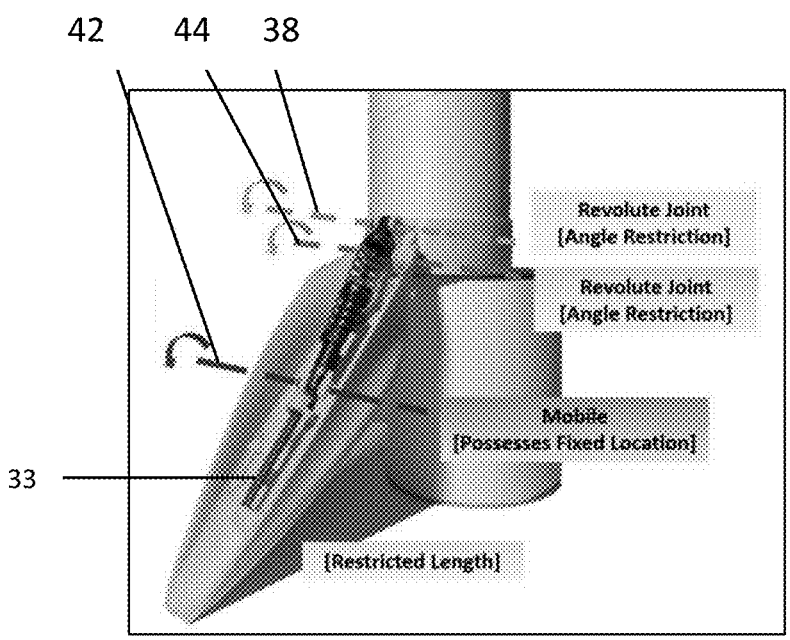
FIG. 5 shows the relative positions of the connection points and degrees of freedom of rotation for the landing legs of the first embodiment.

FIGS. 4 and 5 show the relative positions of the three points of rotation and degrees of freedom of rotation for landing leg 14, as well as the permitted co-dependent linear displacement (with respect to the local reference frame of the landing leg) for the deployment process of the landing leg from the folded to the unfolded state. This configuration also applies to the other three landing legs. The first revolute joint 44 is at the connection of the landing leg to the rocket body multi-purpose module 40, which is a sleeve-shaped component mounted to the exterior surface of the tubular portion 12 of the rocket assembly 10. The first revolute joint 44 is configured to connect the body 13 of the landing leg 14 to the tubular portion 12 of the rocket assembly 10 and to control pivotal rotation of the body 13 relative to the tubular portion 12. The second revolute joint 38 is at the connection 46 of the rocket body multi-purpose module 40 to the shock absorber 26. The second revolute joint 38 is configured to pivotally connect the second end of the shock absorber 26 to the rocket assembly 10. The third point of rotation, at 42 shown in FIG. 5, provides one degree of freedom of rotation for enablement of motion of the shock absorber with respect to the translational motion of the linear bearing module 52. The linear bearing module 52 is configured to allow the body 13 to pivot from the folded storage position to the unfolded operating position. The linear bearing module 52 includes a connection point for connection to the second end portion of the shock absorber 26. For illustration purposes in FIG. 4, the shock absorber 26 and the linear bearing module 52 are indicated as disconnected. FIG. 4 also shows the case 39 for the solenoid unfolding mechanism.

The first and second embodiments include a pair of parallel dual rebound springs 33 (one (see FIG. 5), three or more), associated with the first pair of rod shafts 27, the first bias component 31 and a linear rod shaft 28 making up one possible shock absorber type (viscous damping), being configured to enable rotation of the landing leg from a folded storage position to an unfolded operating position.

Figure 6A:
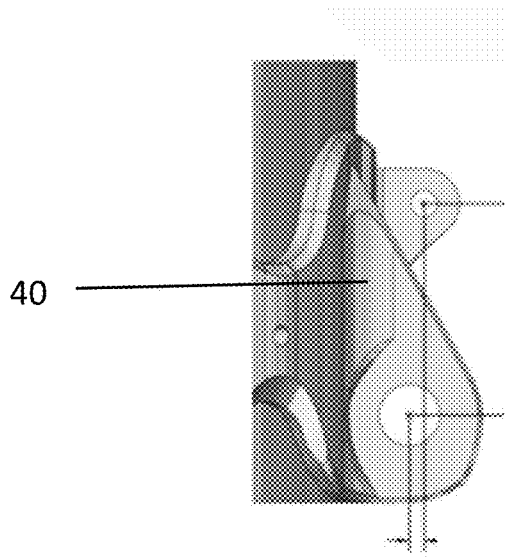
FIG. 6A shows a rocket body multipurpose module of the first embodiment.
Figure 6B:
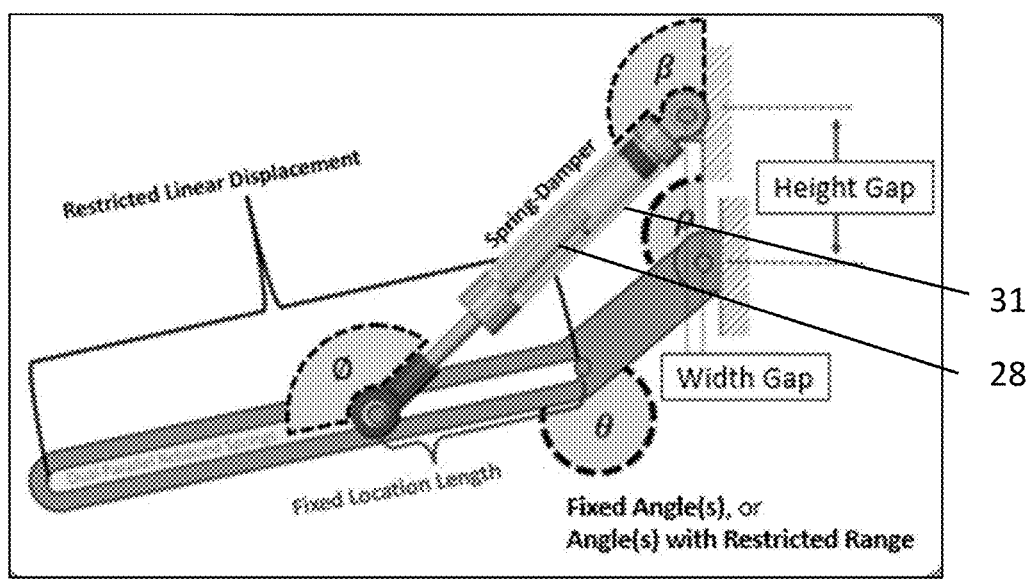
FIG. 6B shows angular details for the landing legs attachment point of the first and second embodiments.

FIG. 5 shows angular/rotational details for the landing legs of the first, and second embodiment. The values of the spring coefficient(s) and dampening coefficient(s) related to the mechanical components (e.g. shock absorber, rotational damper, rebound springs, flexible material, and additional components (see FIGS. 6A-6B) of the linkage mechanism must be selected in order to simultaneously satisfy two stability criteria. These criteria are (a) the landing leg unfolding stage, and (b) rocket stabilization during contact with the landing pad. The rocket body multipurpose module 40 is shown in FIG. 6A.

Figure 7:
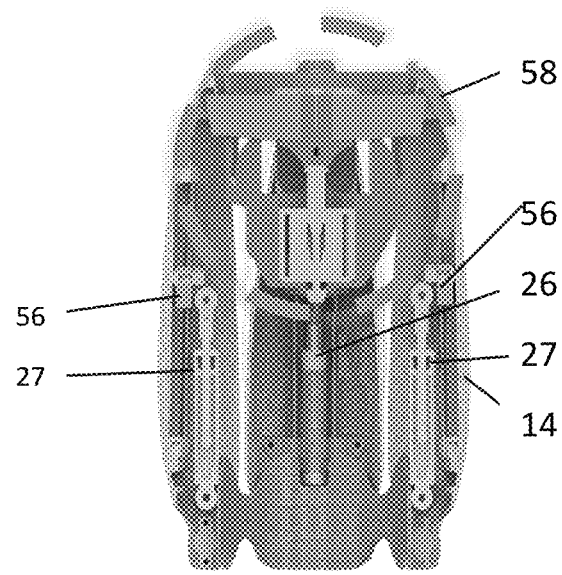
FIG. 7 shows cross-sectional and end views of an exemplary solenoid unfolding compartment used in the first, second, and third embodiments.

FIG. 7 shows internal details of a landing leg when it is in a storage position. The shock absorber (spring-damper) 26 overlaps with the pair of rod shafts 27 when viewed from the inner side of the landing leg 14, when in a compressed spring state. In other embodiments including the second embodiment, the shock absorber (spring-damper) 26 is parallel and in proximity to the pair of rod shafts 27. In the embodiment shown in FIG. 7, linear ball bearings 56 are included/embedded inside the linear bearing multi-purpose module 52 (shown in FIG. 11D) to enable translational motion along the pair of rod shafts 27 that are fixed along the middle portion of the inner side of the landing leg body.

Figure 8:
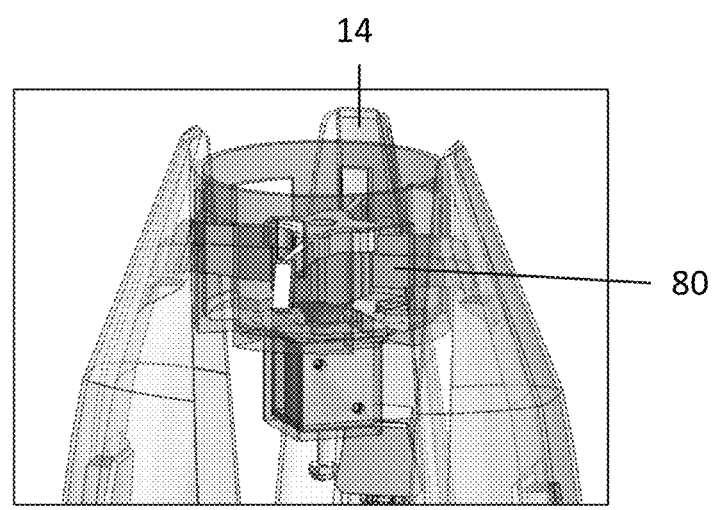
FIG. 8 shows a solenoid-powered unfolding of the landing legs of first, second, and third embodiments.

FIG. 7 shows a cross-sectional view of a non-limiting example of a power source used in the first embodiment, which is a solenoid 58, and FIG. 8 shows a solenoid-powered unfolding of the landing legs of the first, second and third embodiments. The power source is able to provide the appropriate displacement for the unfolding module 74.

FIG. 9A shows a cross-sectional view of the rotational damping details. A bi-directional rotary damper 62 is used which allows for dampening at any point of rotation of a landing leg, whether the respective vertical motion of the rocket body is upward or downward. In this manner, the vertical and rotational motions of the system are interrelated, relative to the linkage mechanism made from the connections of the mechanical components within the landing leg related to the shock absorber 26, as well as the forementioned rotary damper 62, as they both contribute to the stabilization of the rocket in the vertical direction, a desired displacement direction for successful recovery of the tubular portion 12. The circle shown with broken lines focuses on the compressed spring plunger 64 interacting with the wall of the landing leg 14. FIG. 9B further shows details of the spring plunger 64 used in the first and second embodiments. The spring plunger 64 allows for the rail slide to lock into the fully unfolded landing leg position. In selecting a suitable spring plunger 64, a longer spring plunger head 66 is more suitable for the mode of locking, i.e. placement of the spring plunger 64 within the cavity of the landing leg 14 when in an extended position. The spring plunger 64 used in the first and second embodiments typically is made of a metal alloy, a thermoplastic material, and/or a thermoset material. The material possesses high strength in the radial (shear) direction. In one embodiment (not shown) the spring plunger can be threaded into the module, i.e. the landing leg rail slide, which is analogous to the linear bearing multi-purpose module of the first embodiment. Non-limiting examples of suitable sources for a spring plunger include Vlier brand Spring Plunger Products (vlier.com).

FIG. 10 shows details of the first revolute joint 38 and second revolute joint 44, and the respective combination of components for the revolute joint assembly indicated. FIG. 10 also shows fastener insert locations for the landing leg 14, and a fastener 70 with a threaded region for a fixed connection to the landing leg 14, a grip length as it pertains to the revolute joint(s) and an indentation cavity 72 compatible with a bi-directional rotary damper 62.

Figure 11C:
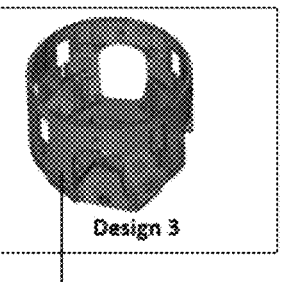
Figure 11D:
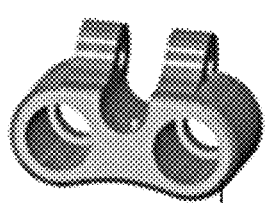
Figure 11E:
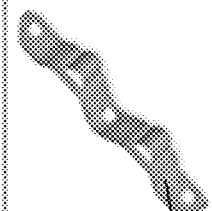
Figure 11F:
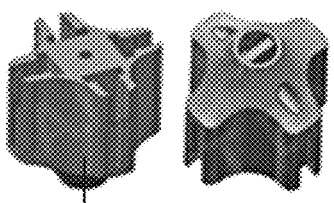
Figure 11G:
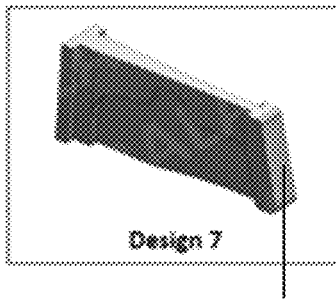
Figure 11H:
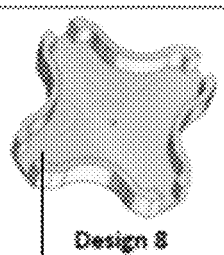
Figure 11I:
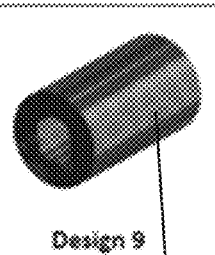

FIGS. 11A-11I show component parts of the landing system that can be made by additive manufacturing in accordance with certain embodiments. These component parts also can be formed or molded such as by injection molding, compression molding, blow molding, casting, and machining, etc. FIG. 11A shows front and back sides of a landing leg 14. FIG. 11B illustrates one version of the rocket body multipurpose module 40 adapted for use with a rocket having four landing legs. FIG. 11C shows a solenoid unfolding module 74. The linear bearing multi-purpose module 52 is shown in FIG. 11D. FIG. 11E illustrates a linear rods fixture 76. FIG. 11F shows top and bottom perspective views of a solenoid extension connector 78. An unfolding landing leg extension 80 is illustrated in FIG. 11G. FIG. 11H shows a solenoid extension connector fixture 82. FIG. 11I shows a rotary damper/fastener connector 84.

Figure 12:
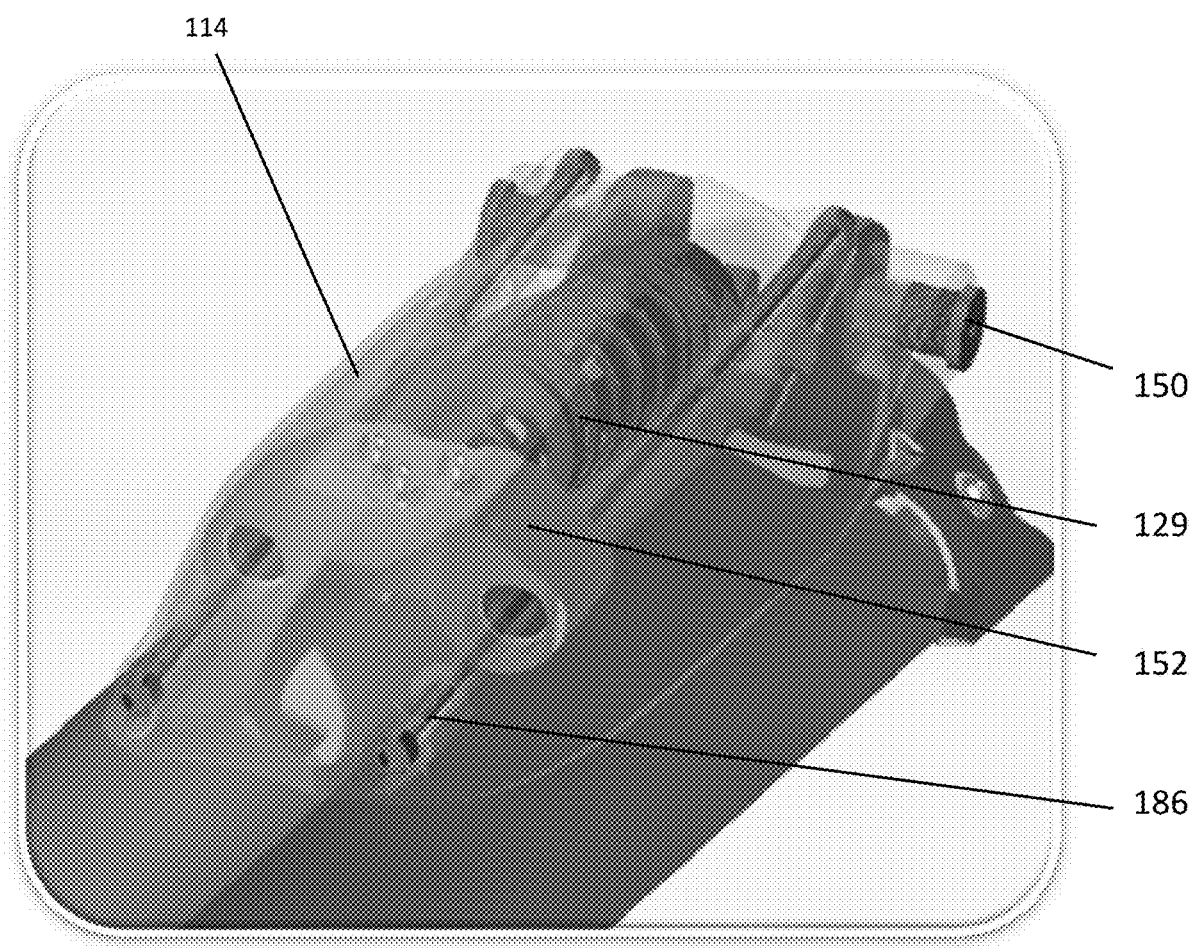
FIG. 12 shows a second embodiment of a rocket landing system that uses bolts from the external face of the landing leg, additionally indicating the geometric profile of a landing leg mounted to a rocket.

FIG. 12 shows a second embodiment of a rocket landing system 111 that uses bolts 186 from the external face of the landing leg 114. The bolts 186 thread into the landing leg 114 via an appropriate pilot hole or a set of threaded inserts embedded on the landing leg and successively into a threaded section on the linear motion rod shafts, on the inner surface area of the linear motion rod shafts 127. This embodiment includes a larger linear bearing multipurpose module 152 relative to a compact linear bearing multipurpose module 52 of the first embodiment.

Figure 13:
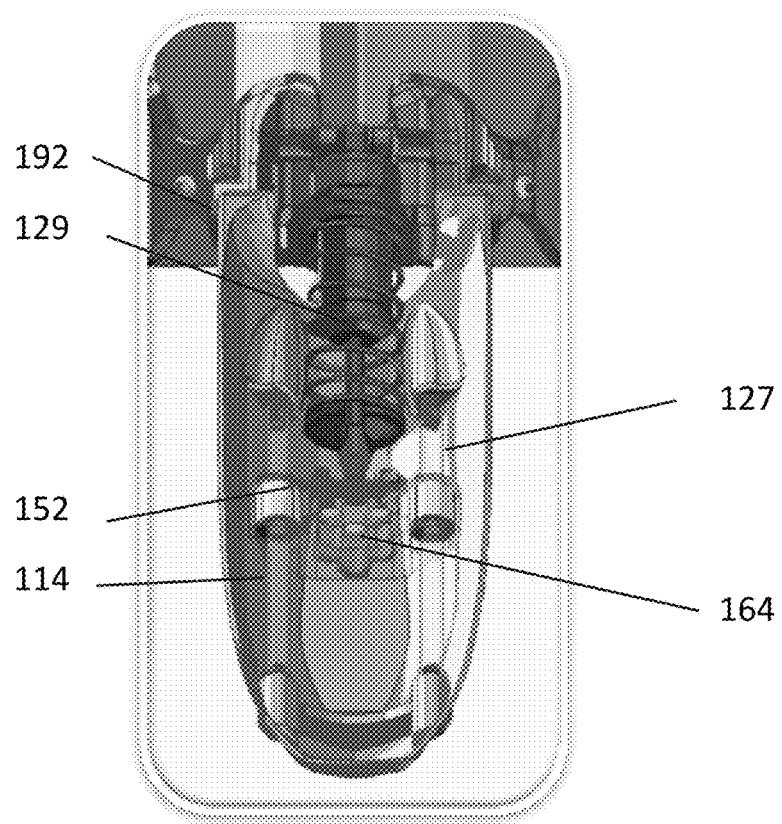
FIG. 13 shows a second embodiment of a rocket landing system that uses bolts from the external face of the landing leg, additionally indicating the geometric profile of a landing leg mounted to a rocket.
Figure 14:
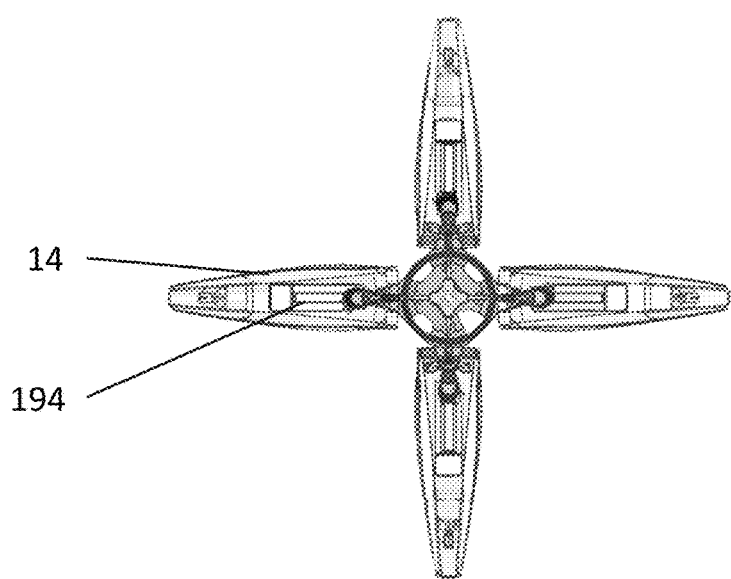
FIG. 14 shows the third embodiment in an unfolded configuration.

FIG. 13 shows details of the internal suspension mechanism of the second embodiment, analogous of FIG. 1. The orientation of the spring plunger 164 and the landing leg 114 is perpendicular via the extruded surface on the inside of the landing leg 114, parallel to the direction of the rod shafts 127. The rod shafts 127 (hollow or solid in nature) are embedded into the landing leg 114 in the appropriate cavity and fixed via bolts 186 from the external face of the landing leg 114. Versions of the linear bearing multi-purpose module with different quantities of spring plungers can be used in the first, and second embodiment(s). For rockets utilizing the first embodiment with lower load capacity, a single spring plunger can be used in each landing leg, based on the geometric constraints demonstrated.

FIGS. 12-13 show various views of a linear bearing multi-purpose module 152, 52 for the high-load capacity version of the rocket assembly 10. The gap length (distance between linear motion rod shafts) changes depending on the type of spring plungers used, and therefore a different version of the linear bearing multi-purpose module 152, 52 would be used with a low-load capacity system.

Figure 15:
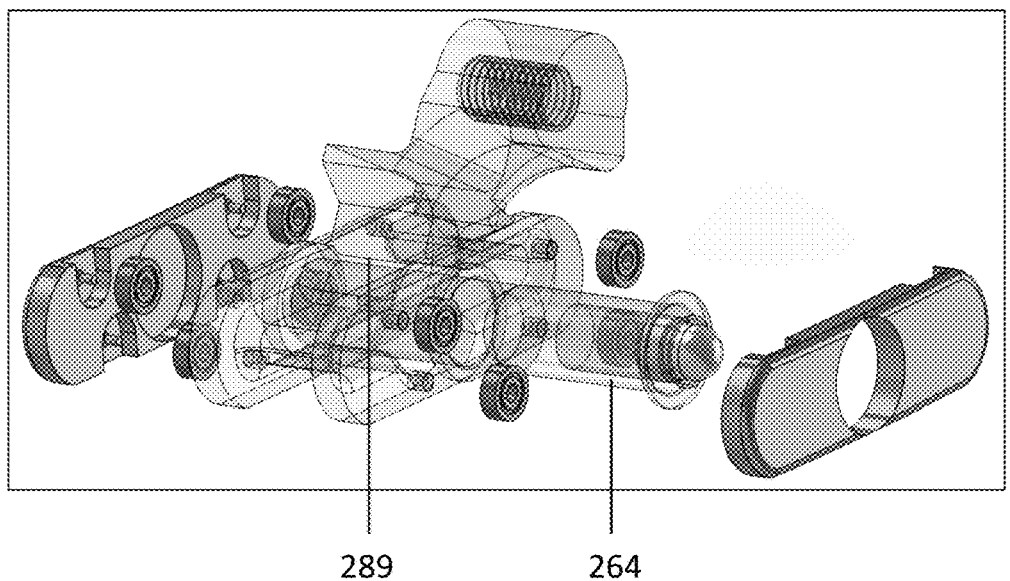
FIG. 15 shows the construction of the spring plunger locking mechanism which travels on the curved rail slide in accordance with the third embodiment.
Figure 16:
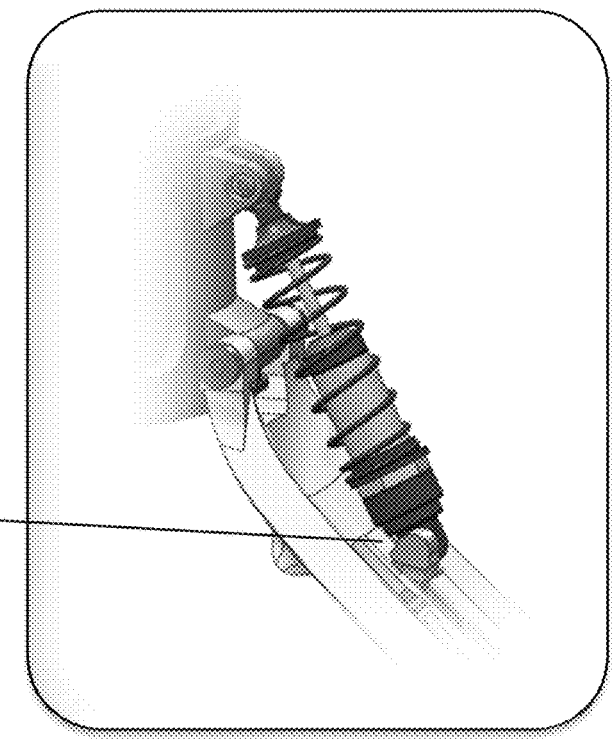
FIG. 16 shows a shock absorber fixed into a location for the landing sequence in accordance with the third embodiment.

FIGS. 15 and 16 illustrate the details of the landing leg rail slide 194 of the third embodiment. The landing leg rail slide 294 matches the curvature profile of the inner surface of the landing leg cavity. FIG. 15 shows the rail slide module 289 that includes the plunger 264. Thus, with the movement of the shock absorber, the rail slide moves accordingly as constrained by the rail cavity and the connection to the shock absorber. One exemplary construction of the slide rail, that includes rotary bearings, as contrasted to the linear ball bearings, of the first and second embodiments.

Figure 17:
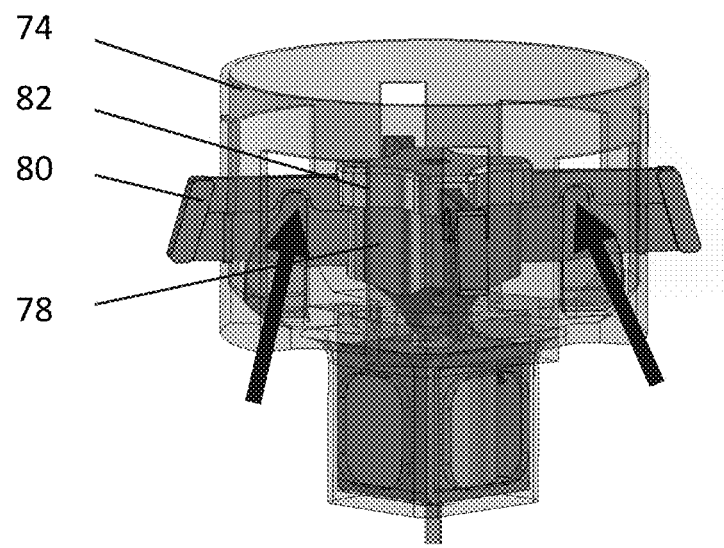
FIG. 17 illustrates design features that assist in the alignment of the unfolding mechanism, specifically compatible indentations between the unfolding landing leg extenders and the solenoid unfolding module used in the first, second, and third embodiments.
Figure 18:
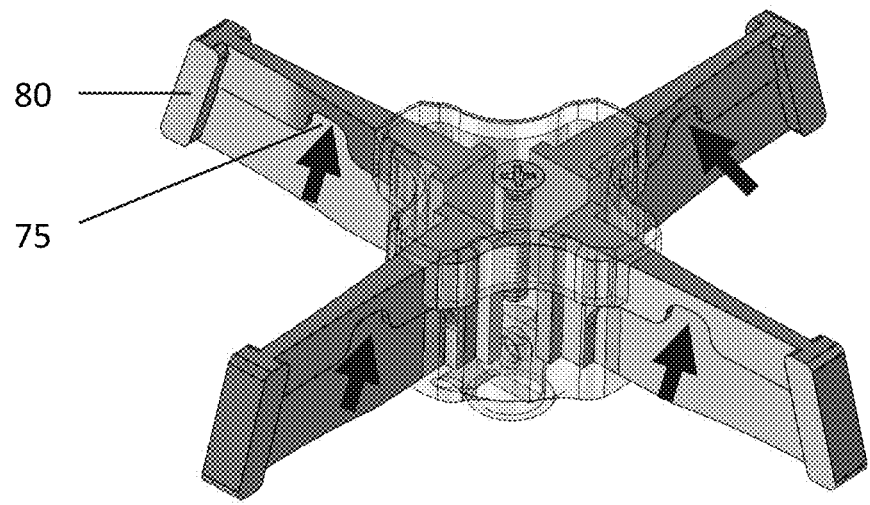
FIG. 18 illustrates the unfolding landing leg extenders and the solenoid unfolding module used in the first, second, and third embodiments.

FIGS. 17 and 18 show the unfolding mechanism of the first, second and third embodiments. FIG. 17 shows the alignment features of the unfolding arms shown in FIGS. 17 and 18. The indentations 75 shown with arrows in FIG. 18 complement the solenoid unfolding module 74 (see FIG. 11C) on the rocket.

Figure 19:
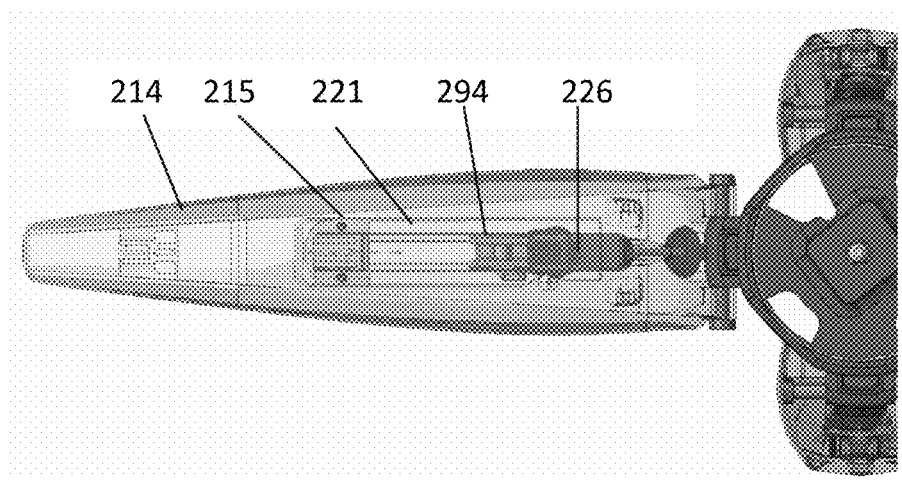
FIG. 19 illustrates further details of the rail enclosure in the third embodiment.

FIG. 19 shows the configuration of a linear bearing module for a third embodiment. This embodiment employs a rail enclosure 221 on the landing leg 214 that closes the curved path of the rail slide 294, the rail enclosure end door 215 is also the component related to sustaining the slide rail within the specified curved region of displacement.

FIG. 19 illustrates further details of the rail enclosure for the third embodiment. For unfolding to take place, the shock absorber 226 releases from the compressed state. In addition to the shock absorber, flexible material is used on the exterior of the landing leg.

Figure 20:
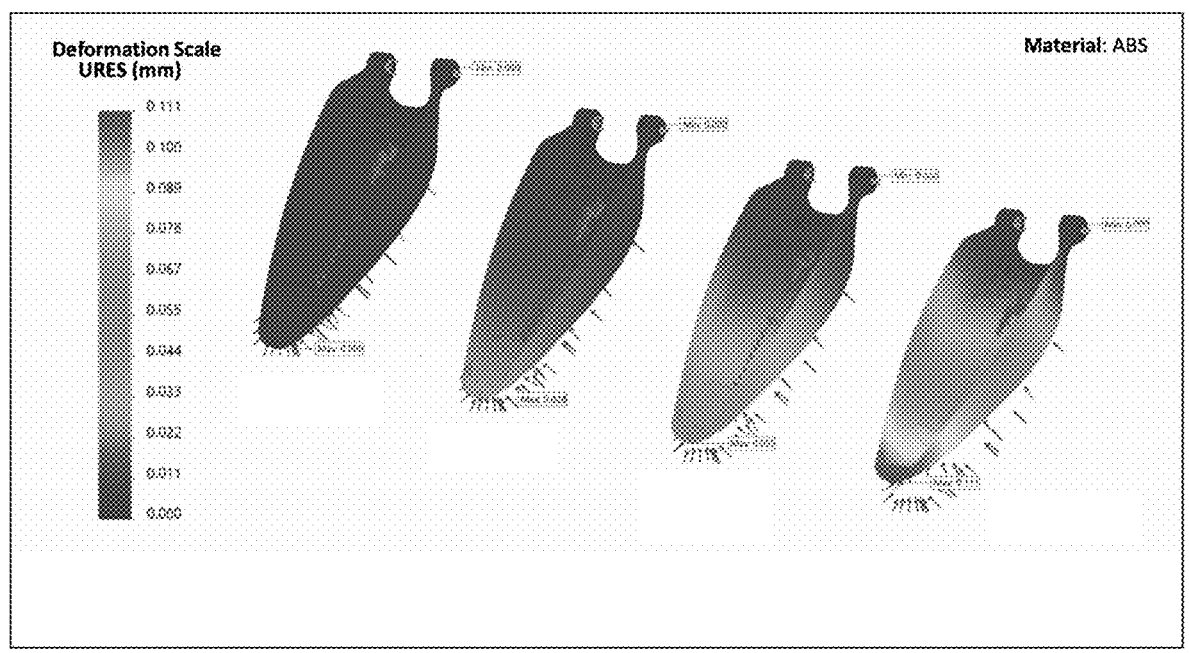
FIG. 20 depicts the static analysis for a single landing leg of the first embodiment.

FIG. 20 illustrates a structural analysis of a single landing leg 14 that is used in combination with three other landing legs in the first embodiment. In general, the outer side is contoured to provide for favorable aerodynamic properties when the landing legs are folded.

Figure 21:
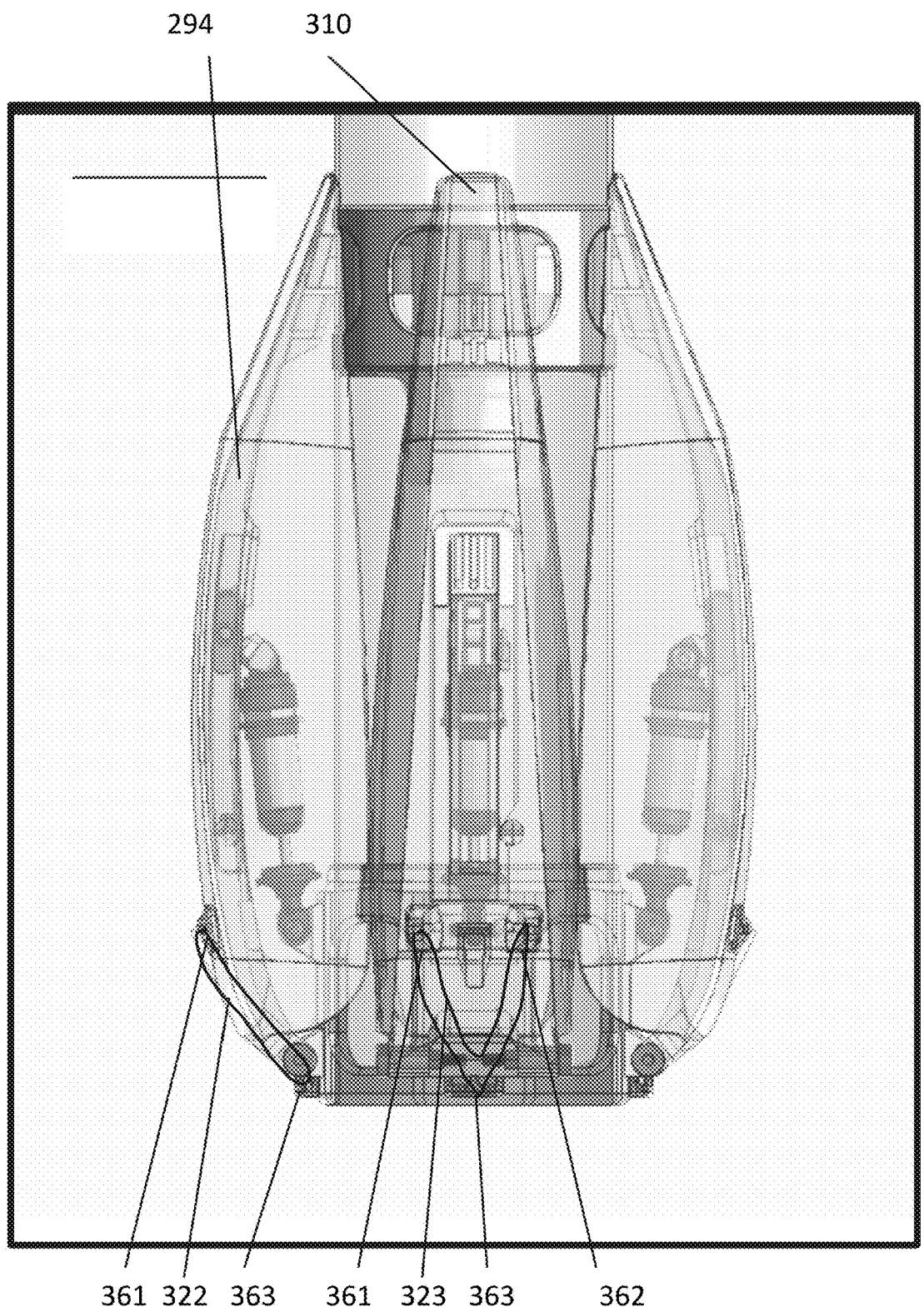
FIG. 21 depicts another embodiment of the design in which the rails are curved to fit the shape of the landing leg, that of the third embodiment.

FIG. 21 shows the fourth embodiment of a rocket landing suspension system in which relatively narrower landing legs 314 are used, and the curved rail slide 394 is used instead of straight linear motion rod shafts. Each landing leg has an elastic cord configured to provide a spring force for the unfolding process.

The flexible material 322, 323, shown in FIG. 21, which may be elastic or inelastic, is connected to the rocket and to the landing leg and is held taut when the landing leg is folded. The flexible material assists in the outward movement or unfolding of the landing leg.

Figure 22:
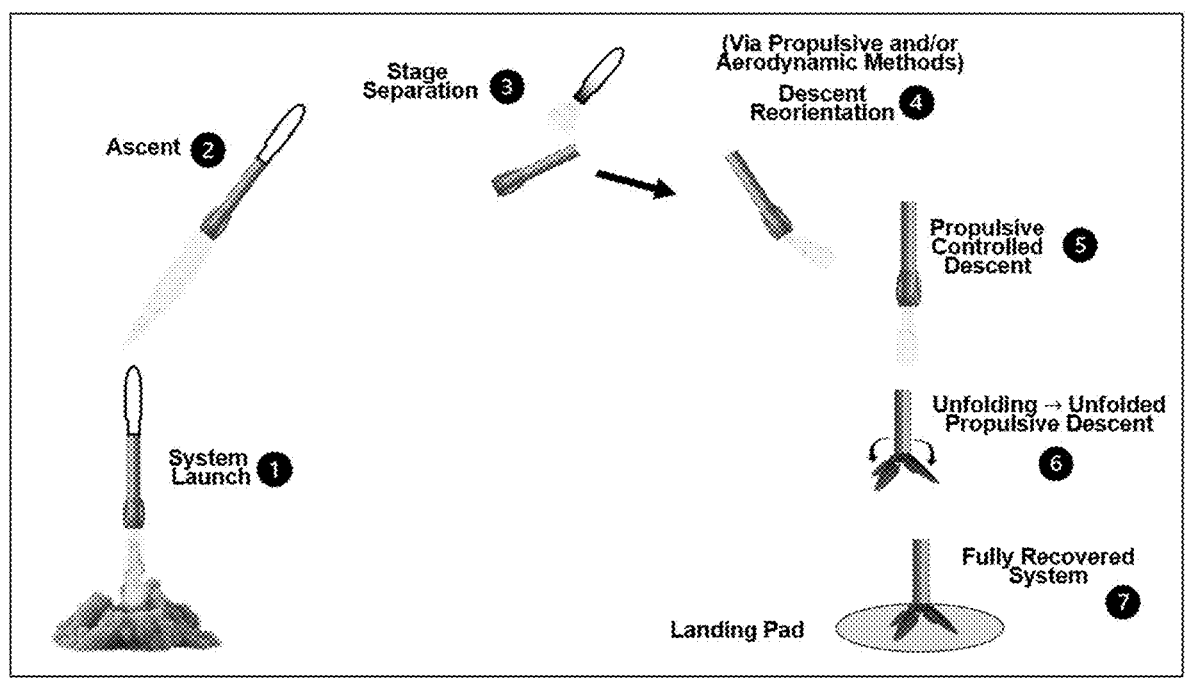
FIG. 22 depicts the entire system from launch until landing, including the different stages within, disclosed in the various embodiments.

FIG. 22 shows a complete sequence of the launching and landing of a propulsive landing rocket system. The system may contain multiple stages, with the first stage containing the landing leg system in the folded state, the system ascents by continued activation of the propulsion system until the appropriate altitude necessary for stage separation for the upper stage(s) to that of stage 1 to carry out orbital insertion for the payload to reach the intended position.

When the first stage separation occurs, stage 1 is independent of the upper stages and possess the remaining fuel to carry out further deceleration during descent, however in the reorientation step relative to the landing pad, it may be require the utilization of aerodynamic features in order to conserve the respective remaining fuel, due to the free falling state of the system interacting with the air flow, movable fins constructed to accommodate the flow under the respective flow conditions in order to achieve a vertical reorientation is necessary.

When a low-suitable altitude is accomplished where the gimbaling propulsive nozzle has adequately address the vertical orientation and decelerated the rocket body to an adequate speed for the load input that the landing legs are to receive during contact, the legs unfold via the unfolding mechanism activation. The rebound springs, shock absorber, and rotational damping systems work in unison to smoothly open the landing legs from the folded position to the unfolded/open position, making the rocket ready to cushion the vibrational input forces that the body is to endure in accordance with Newton's Third Law of Motion. Once the landing is successful the rocket can be serviced and maintained until the next flight, where the landing system requires manual setup to be placed in the folded position prior to the successive system launch.

EXAMPLES

FIGS. 23-28 show computerized flow simulations for the first embodiment of the rocket landing suspension incorporated into a cylindrical rocket body.

Figure 23:
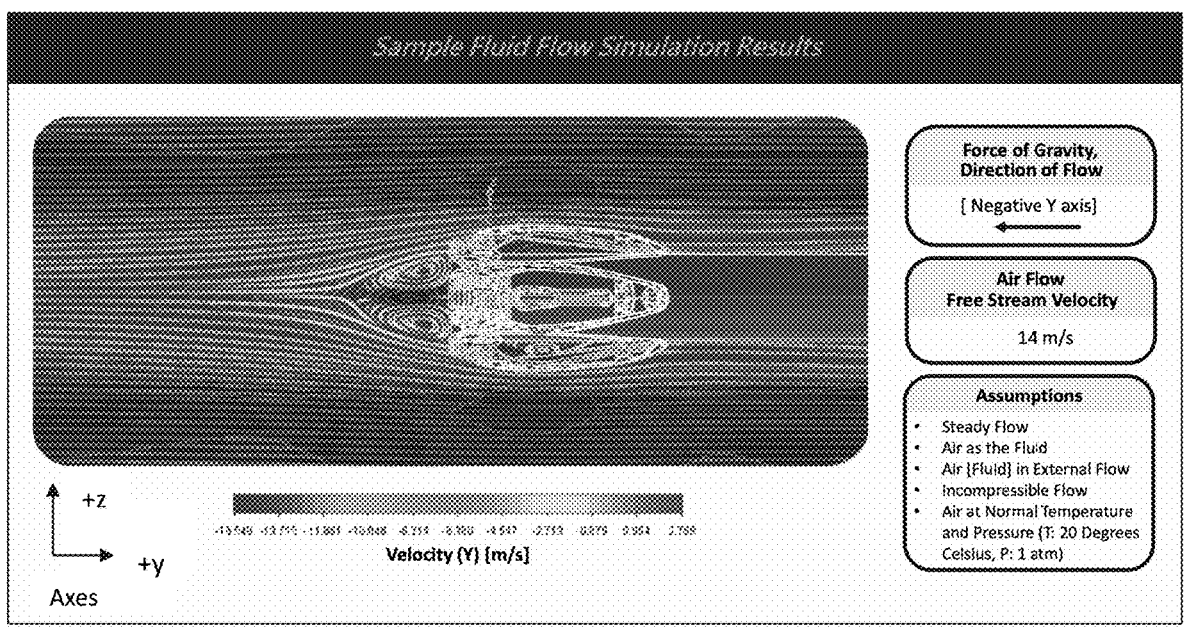
FIG. 23 illustrates the result of a fluid flow simulation in the linear direction associated with the ascent stage for the first embodiment.

FIG. 23. A two-dimensional flow simulation was performed via the cut-plot simulation results option in Solidworks 2021 Flow Simulation (General Purpose-Preliminary Analysis). The geometry indicates the first embodiment of the rocket landing suspension incorporated into a simplified rocket cylindrical body, with consideration of a non-active propulsion unit. The yz-plane selected for the cut-plot was coincident to the centerline of the cylindrical body, depicting the profiles of landing legs in the folded position. The direction of flow was along the negative y-axis, depicting the rocket during its ascent stage with a velocity magnitude of 14 m/s (The velocity of the free stream, accounting for the frame of reference). The direction of gravity was along the negative y-axis acting on the rocket during its ascent stage. The resulting simulation indicates streamlines where respective magnitudes of the flow velocity are indicated by the color range. The cut-plot depicts a steady laminar flow with the formation of a separation bubble enclosed in the region between the aft of the rocket body tube and approximately 3 rocket cylindrical body diameters to the point of reattachment of streamlines. Assumptions associated with the simulation are Steady Flow, Air as the fluid, Constant fluid density (Incompressible), System was in an external flow, Fluid was evaluated at normal temperature and pressure (Temperature: 20 Degrees Celsius, Pressure: 1 atm).

Figure 24:
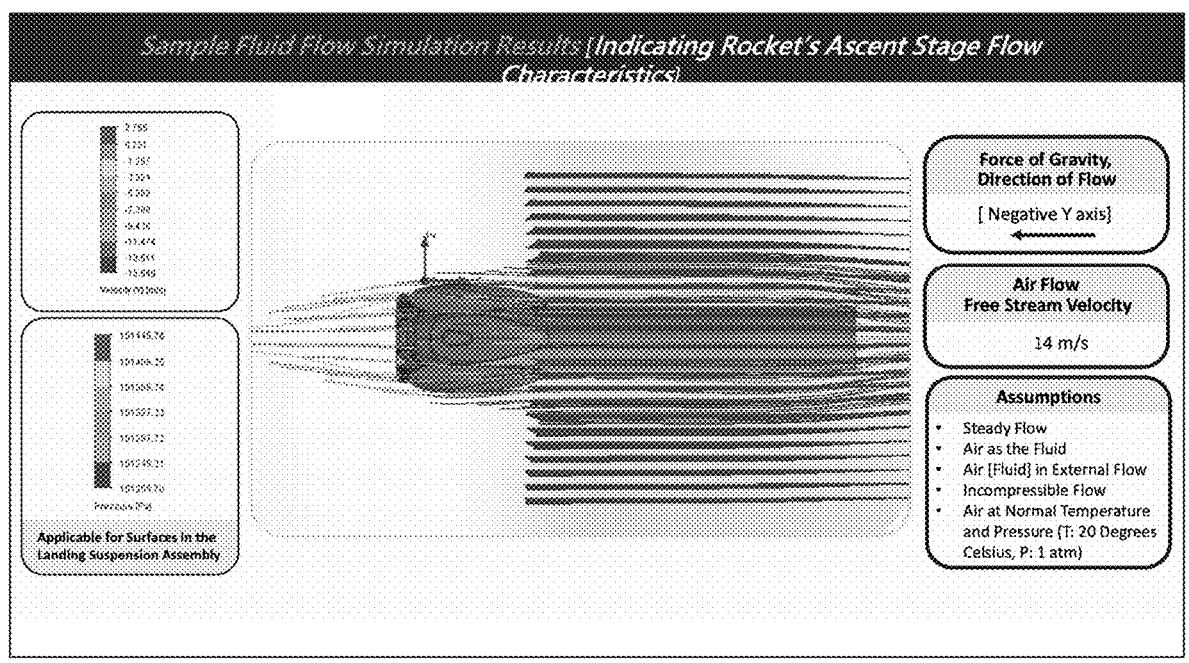
FIG. 24 illustrates the result of a fluid flow simulation in the linear direction associated with the ascent stage for the first embodiment.

FIG. 24. A two-dimensional perspective on the yz-plane selected for the three-dimensional flow trajectories was performed via Solidworks 2021 Flow Simulation (General Purpose-Preliminary Analysis). The geometry indicates the first embodiment of the rocket landing suspension incorporated into a simplified rocket cylindrical body, with consideration of a non-active propulsion unit. The three-dimensional flow trajectories depicted were within a control volume with a square cross-sectional area characterized by a side length of 5 rocket cylindrical body diameters. The direction of flow was along the negative y-axis, depicting the rocket during its ascent stage with a velocity magnitude of 14 m/s (The velocity of the free stream, accounting for the frame of reference). The direction of gravity was along the negative y-axis acting on the rocket during its ascent stage. The resulting simulation indicates streamlines where respective magnitudes of the flow velocity are indicated by the color range. The flow trajectories from right to left depict the stagnation point at the front of the rocket, due to the respective simplification of the rocket body as a blunt body (cylinder with the absence of an aerodynamic cone), the flow along the length of the cylindrical body works to achieve stability comparable to that of the free stream velocity. When the flow encounters the external geometry of the landing legs, it is directed towards the aft of the rocket sustaining a relatively conservative separation region as discussed in FIG. 23, and hence providing control over the pressure drag. The surface plot, considering the external surfaces of the landing legs (ignoring the surface of the rocket cylinder body) depicts the pressure by the respective color range in units of Pascals, specifying the relatively higher surface pressure related with the stagnation point of the flow at the front of the landing leg(s) with respect to the ascent orientation. Assumptions associated with the simulation were Steady Flow, Air as the fluid, Constant fluid density (Incompressible), System was in an external flow, Fluid was evaluated at normal temperature and pressure (Temperature: 20 Degrees Celsius, Pressure: 1 atm).

Figure 25:
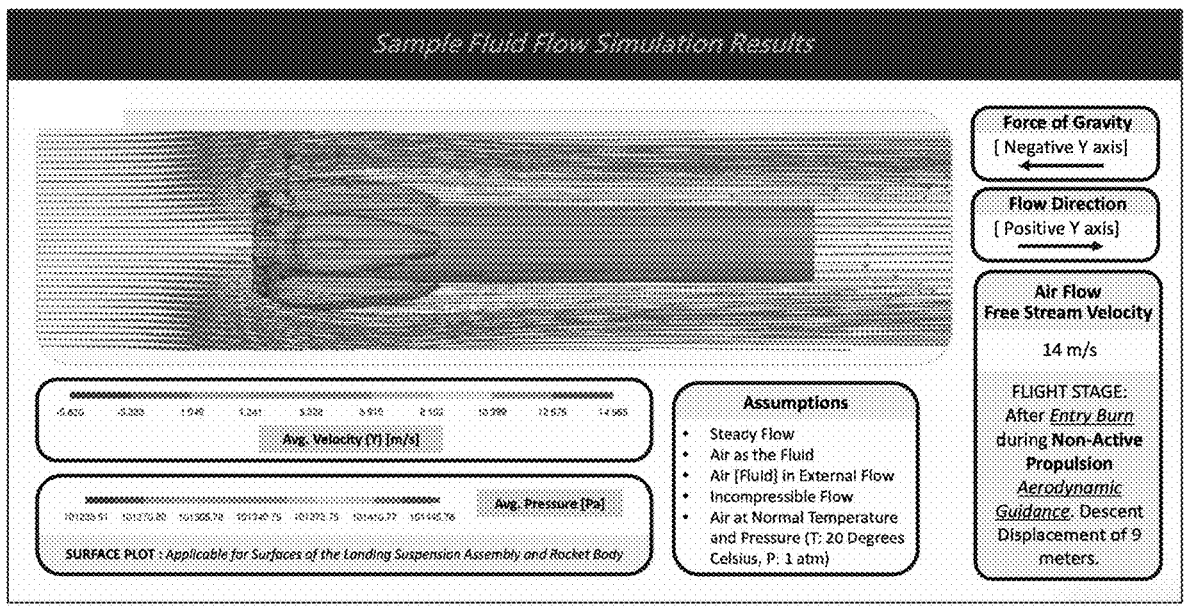
FIG. 25 illustrates the result of a fluid flow simulation in the linear direction associated with the descent stage for the first embodiment.

FIG. 25. A two-dimensional perspective on the yx-plane selected for the three-dimensional flow trajectories was performed via Solidworks 2021 Flow Simulation (General Purpose-Preliminary Analysis). The geometry indicates the first embodiment of the rocket landing suspension incorporated into a simplified rocket cylindrical body, with consideration of a non-active propulsion unit. The direction of flow was along the positive y-axis, depicting the rocket during its descent stage with a velocity magnitude of 14 m/s (The velocity of the free stream, accounting for the frame of reference). The direction of gravity was along the negative y-axis acting on the rocket during its descent stage. The resulting simulation indicates streamlines where respective magnitudes of the flow velocity are indicated by the color range. The flow trajectories from left to right depict the stagnation point at the aft of the rocket with respect to the ascent orientation, due to the respective simplification of the rocket body as a blunt body (cylinder with absent geometric assumption regarding the outlet of the propulsion unit) the redirection of flow relative to the face associated with the point of stagnation was facilitated by the suitably allocated curvature along the length of the landing legs. The surface plot, considering the surfaces of both the landing legs and the rocket cylindrical body depicts the pressure by the respective color range in units of Pascals, specifying the pressure associated with the external surfaces of the rocket, due to the impact of the air flow depicted via the trajectories. Assumptions associated with the simulation were Steady Flow, Air as the fluid, Constant fluid density (Incompressible), System was in an external flow, Fluid was evaluated at normal temperature and pressure (Temperature: 20 Degrees Celsius, Pressure: 1 atm).

Figure 26:
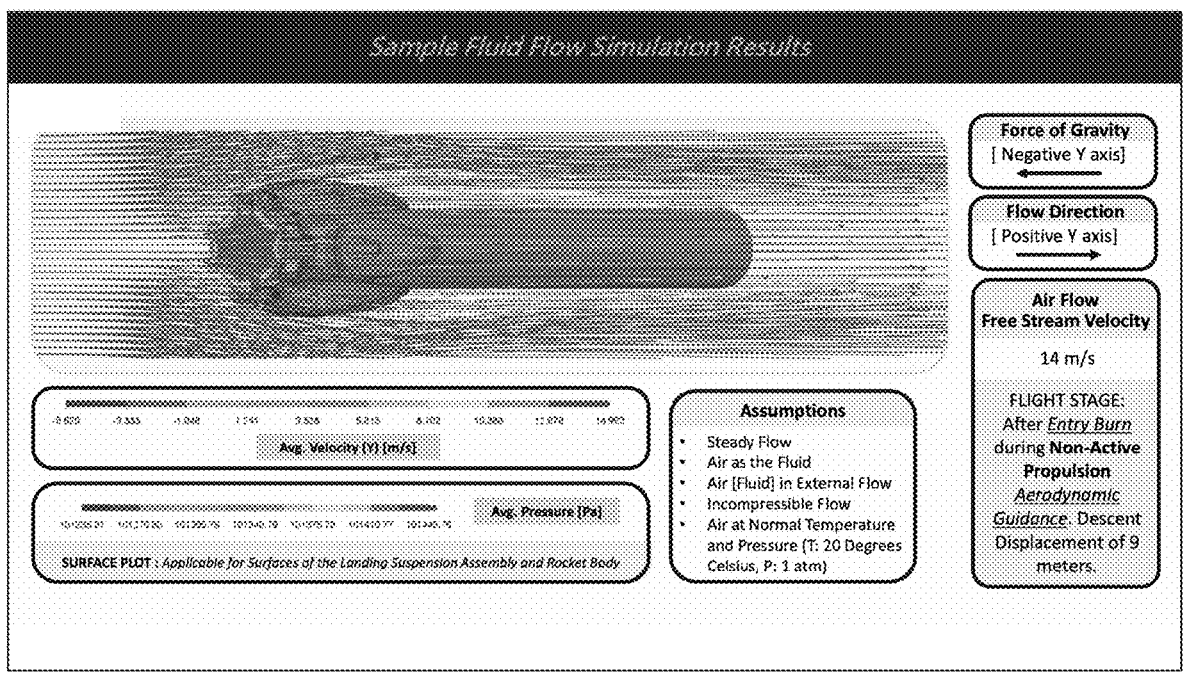
FIG. 26 illustrates the result of a fluid flow simulation in an angled direction associated with the descent stage for the first embodiment.

FIG. 26. Depicts an angled aft perspective of the rocket during descent, complimentary to FIG. 25, in order to provide a visualization of the surface not provided in the respective figure. The overlapping information of the flow trajectories' velocity data, complimented by the surface plot indicating the surface pressure data, suitably assists in establishing the influence of the landing suspension when in the folded position in the rocket's descent stage of flight, relative to the aft region of the rocket. Assumptions associated with the simulation were Steady Flow, Air as the fluid, Constant fluid density (Incompressible), System was in an external flow, Fluid was evaluated at normal temperature and pressure (Temperature: 20 Degrees Celsius, Pressure: 1 atm).

Figure 27:
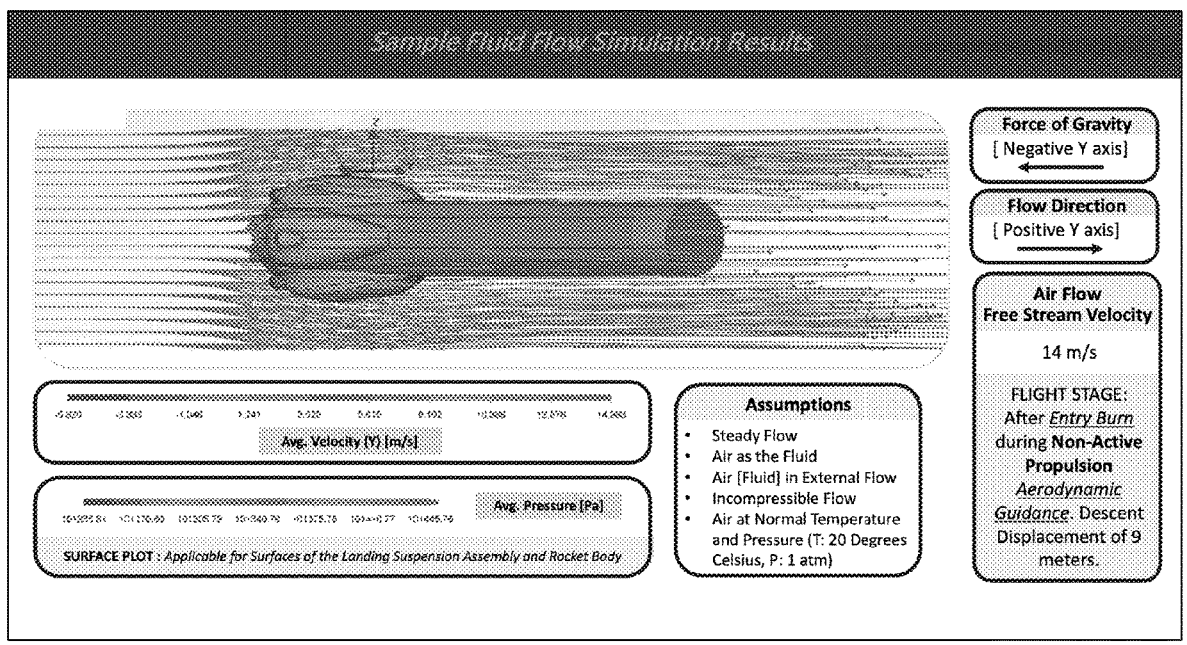
FIG. 27 illustrates the result of a fluid flow simulation in an angled direction associated with the descent stage for the first embodiment.

FIG. 27. Depicts an angled top perspective of the rocket during descent, complimentary to FIG. 25, in order to provide a visualization of the surface not provided in the respective figure. The overlapping information of the flow trajectories' velocity data, complimented by the surface plot indicating the surface pressure data, suitably assists in establishing the influence of the landing legs on the air flow when in the folded position in the rocket's descent stage of flight, relative to the front/top region of the rocket. Assumptions associated with the simulation were Steady Flow, Air as the fluid, Constant fluid density (Incompressible), System was in an external flow, Fluid was evaluated at normal temperature and pressure (Temperature: 20 Degrees Celsius, Pressure: 1 atm).

Figure 28:
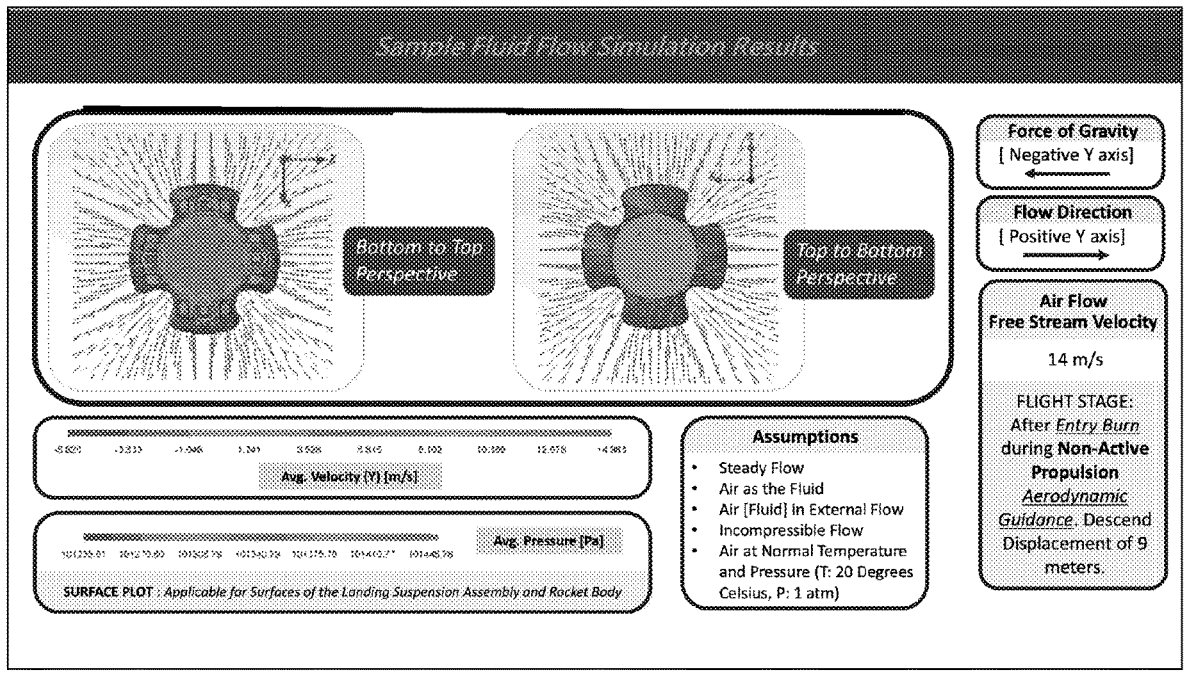
FIG. 28 illustrates the result of a fluid flow simulation in an top and bottom direction associated with the descent stage for the first embodiment.

FIG. 28. Depiction of cross-sectional views of the rocket with respect to the plane perpendicular to the orientation of the rocket, when in a stable vertical flight. Complimentary to FIG. 25, FIG. 26, and FIG. 27. The overlapping information of the flow trajectories' velocity data, complimented by the surface plot indicating the surface pressure data, suitably assists in establishing the influence of the landing legs on the air flow when in the folded position in the rocket's descent stage of flight, specifying the steady transition of the air particles from the top curvature to the side panel curvature of the landing legs and the related juncture of air flow between the four symmetrically oriented landing legs. Assumptions associated with the simulation were Steady Flow, Air as the fluid, Constant fluid density (Incompressible), System was in an external flow, Fluid was evaluated at normal temperature and pressure (Temperature: 20 Degrees Celsius, Pressure: 1 atm).

Figure 29:
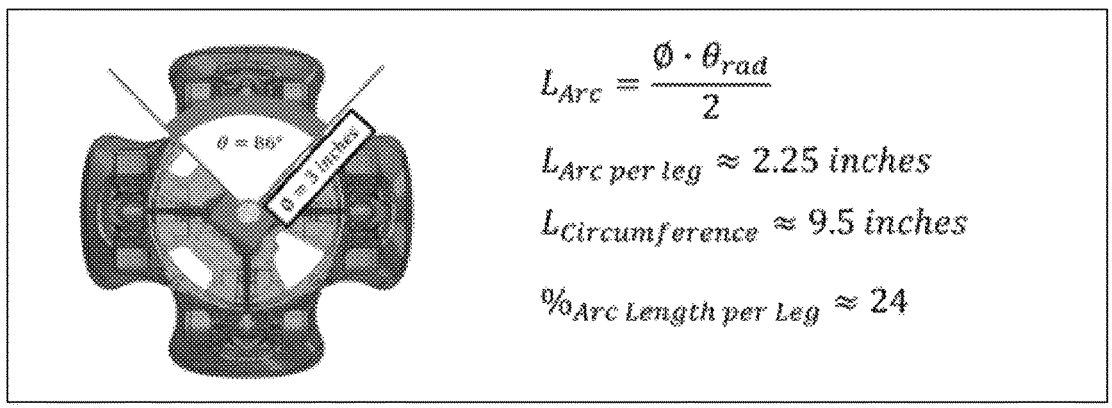
FIG. 29 shows an example of a technique for scaling the landing leg system for rockets of different sizes.

The embodiments disclosed in this application can be scaled for various sized rockets, including models rockets, sub-orbital and orbital class rockets. One non-limiting example of scaling of the landing suspension system is provided in FIG. 29. In embodiments, the landing suspension system performs under excessive instantaneous loads during contact with the landing pad, in certain impact orientations even on a single land leg until stabilization achieved. It is important to consider the size of the landing leg relative to the diameter of the tubular portion of the rocket being considered. The suspension system's non-dependence on landing leg mass in order to be assisted by the force of gravity offers significant implementation potential for orbital class rockets, since the unfolding procedure is optimized by the selection of ample spring and damping coefficients. It is advantageous for manufacturing processes, materials, and design optimization tools to allow for further spatial reductions of the geometry and enhancements in the stress management under the related bending forces experienced by the landing leg assembly.

When scaling for sub-orbital and orbital class rockets, it is useful for the arc length the landing leg occupies to be greater than 15 percent and less than 24 percent of the circumference of the rocket body tubular portion assuming a 4-landing leg configuration. The circumference metric mentioned with respect to landing leg system scaling for different rocket body sizes is a function of a variety of considerations relative to the complementary components that rely on the unfolding and folding process for the landing leg embodiment 1. Large scale rockets, sub-orbital and/or orbital class rocket are typical large in mass and require significant mass (rocket body mass, landing system mass, fuel for propulsive unit to land) to be vibrationally managed during landing contact, thus considerable spring stiffness and damping would need to be implemented for the sub-orbital and/or orbital class rocket. In order to possess larger stiffness and damping characteristics, if viscous damping is to be utilized, it would infer that larger shock absorbers would be required influencing the amount of space/volume to be predisposed to such a shock absorber and hence would directly affect the linkage mechanism to grow as well for accommodation purposes.

It is important to note that alternations to the scaling of components can lead to mass distributions that may influence unfavorable results such as added drag, or instability due to an irrecoverable center of gravity positioning required for a set configuration.

In some embodiments, the rocket is sized as a model rocket and typically has a tubular portion with a length in the range of about 24 inches to about 40 inches and a diameter of about 3 inches to about 5 inches. The landing legs have a length of about 7 inches to about 10 inches, and a width of about 1 inch to about 2.5 inches.

In some cases, the rocket is sized as a suborbital/orbital class rocket and typically has a tubular portion with a length in the range of about 100 feet to about 150 feet and a diameter of about 10 feet to about 20 feet. The landing legs have a length of about 20 feet to about 40 feet, and a width of about 3 feet to about 6 feet.

A number of alternatives, modifications, variations, or improvements therein may be subsequently made by those skill in the art, which are also intended to be encompassed by the following claims.

What is claimed is:

1. A rocket landing leg, comprising,
    a body having a first end portion configured to contact a surface upon landing, a central portion, and a second end portion configured to be pivotally connected to a rocket,
    a first revolute joint configured to connect the body to the rocket and to control pivotal rotation of the body relative to the rocket,
    a first rod shaft connected to opposite first and second ends of the central portion of the body, a first bias component associated with the first rod shaft, the first bias component and first rod shaft being configured to enable rotation of the landing leg from a folded storage position to an unfolded operating position,
    a shock absorber connected to the central portion and configured to be directly or indirectly connected to the rocket, the shock absorber including a central shaft associated with a shock absorbing spring configured to allow for limited pivotal movement of the landing leg relative to the rocket before the landing leg initially contacts the landing surface, and a damping unit configured to cushion the landing of the rocket upon contact with the landing surface,
    a second revolute joint configured to pivotally connect the second end of the shock absorber to the rocket,
    a linear bearing module configured to allow the body to pivot from the folded storage position to the unfolded operating position, the linear bearing module including a connection point for the second end portion of the body, and the second end portion of the shock absorber,
    a locking mechanism configured to lock the landing leg in the storage position or the operating position, and
    a power source configured to permit and/or power rotation of the landing leg between the storage position and the operating position.

2. The rocket landing leg of claim 1, wherein the first rod shaft is configured to be straight.

3. The rocket landing leg of claim 1, wherein the first rod shaft is configured to be curved.

4. The rocket landing leg of claim 1, wherein the speed of unfolding is controlled by at least one of the following: a shock absorber, a rotational damper, a rebound spring and a flexible material.

5. The rocket landing leg of claim 1, further comprising a second rod shaft positioned parallel to the first rod shaft to provide increased stability for the landing leg.

6. The rocket landing leg of claim 1, wherein the body geometry is cup-shaped.

7. A system, comprising a plurality of the landing legs of claim 1, and a rocket body multipurpose module configured to connect the landing legs to a rocket.

8. The system of claim 7, wherein each landing leg includes a shock absorber.

9. A system, comprising a plurality of the landing legs of claim 1, a rocket, and a rocket body multipurpose module connecting the landing legs to the rocket.

10. The system of claim 9, including at least three landing legs.

11. A method of landing a rocket comprising using at least two of the landing legs of claim 1.

* * * * *